H. READ.
Thrashing Machine.

No. 49,551.

Patented Aug. 22, 1865.

Witnesses
Wm Trewin
Ther. Tusch

Inventor
H Read
By Munn & Co
Attys

UNITED STATES PATENT OFFICE.

HENRY READ, OF YPSILANTI, MICHIGAN.

IMPROVEMENT IN THRASHING-MACHINES.

Specification forming part of Letters Patent No. 49,551, dated August 22, 1865.

*To all whom it may concern:*

Be it known that I, HENRY READ, of Ypsilanti, in the county of Washtenaw and State of Michigan, have invented a new and useful Improvement in Thrashing-Machines; and I do hereby declare that the following is a full, clear, and exact description thereof, which will enable those skilled in the art to make and use the same, reference being had to the accompanying drawings, forming part of this specification, in which—

Figure 1:
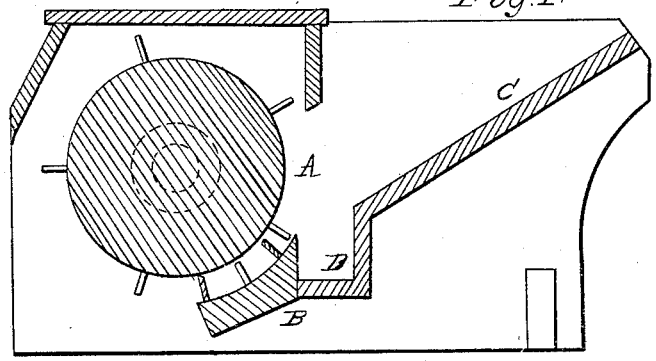
Figure 2:
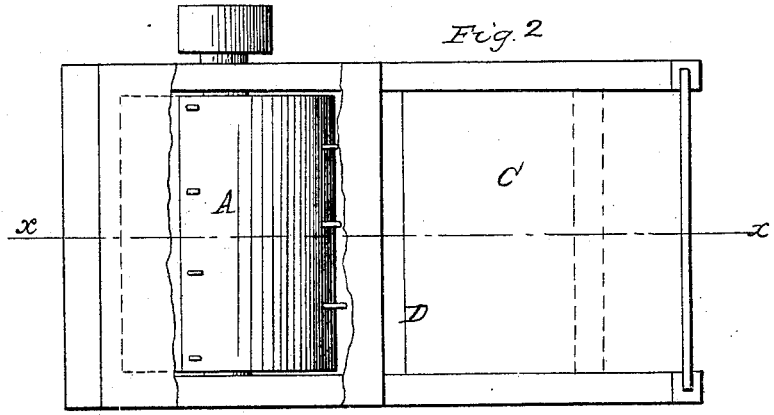
Figure 3:
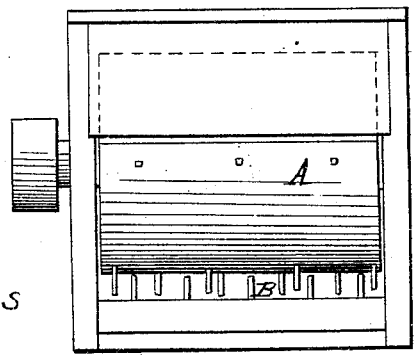

Figure 1 is a side sectional view of a thrashing-machine with my invention applied to it, taken in the line $x\ x$, Fig. 2; Fig. 2, a plan or top view of the same; Fig. 3, a front view of the same.

Similar letters of reference indicate corresponding parts.

This invention is designed to obviate the difficulty attending the passage of stones and other hard foreign substances with the grain into thrashing-machines, a contingency which frequently occurs and causes great damage to the machine, sometimes completely disabling it.

The invention consists in having the bottom of the feed-box or hopper of a thrashing-machine provided with a recess just in front of the thrashing-cylinder, as hereinafter fully shown and described, whereby any stones or other hard foreign substances which may chance to be in the bundled grain fed into the machine will be immediately thrown into said recess by the thrashing-cylinder and prevented from passing through the machine.

A represents the thrashing-cylinder, and B the concave, of a thrashing-machine. These parts may be of the usual construction, and therefore do not require a minute description.

C represents the feed-box of the thrashing-machine, which box is constructed with a recess or chamber, D, extending across its whole width, just in front of the thrashing-cylinder A. This recess or chamber D, when the machine is in operation, should be filled with grain, so that it will not obstruct the passage of the bundles of grain into the machine.

If a stone or other hard foreign substance should pass with the bundle of grain into the machine the thrashing-cylinder will throw it back into the recess or chamber D. Hitherto no means have been devised to catch or retain such substances, and they have passed between the cylinder and concave, breaking the teeth thereof, and frequently disabling the machine so as to render repairs necessary before it can be further used.

The application of this invention will not add materially to the cost of the construction of a thrashing-machine, and it may be advantageously applied to clover as well as grain thrashing machines; also, to that class of cider-mills which are provided with a toothed cylinder and concave.

Having thus described my invention, I claim as new and desire to secure by Letters Patent—

The application to the feed-boxes or hoppers of thrashing and analogous machines of a recess or chamber arranged relatively with the toothed cylinder of the machine, to operate substantially in the manner as and for the purpose herein set forth.

HENRY READ.

Witnesses:
HENRY MASON,
W. LEE YOST.